(12) United States Patent
Johnson

(10) Patent No.: US 7,927,057 B2
(45) Date of Patent: Apr. 19, 2011

(54) OCEAN COMMERCE TRANSFER SYSTEM

(76) Inventor: Albert Sidney Johnson, Fairfax, VA (US)

( * ) Notice: Subject to any disclaimer, the term of this patent is extended or adjusted under 35 U.S.C. 154(b) by 338 days.

(21) Appl. No.: 12/194,297

(22) Filed: Aug. 19, 2008

(65) Prior Publication Data

US 2010/0047041 A1    Feb. 25, 2010

(51) Int. Cl.
  *B63B 27/00*    (2006.01)
  *B65G 67/60*    (2006.01)
  *B64B 1/06*     (2006.01)
  *B64B 1/22*     (2006.01)

(52) U.S. Cl. ............... 414/137.6; 414/137.2; 414/142.6; 244/127

(58) Field of Classification Search .................... 104/89; 212/71; 244/1 R, 24, 30–31, 127; 414/137.1, 414/137.2, 137.6, 139.4, 139.9, 141.3–141.7, 414/142.6
See application file for complete search history.

(56) References Cited

U.S. PATENT DOCUMENTS

| | | | | |
|---|---|---|---|---|
| 1,525,950 | A * | 2/1925 | Prescott | 414/140.8 |
| 3,270,895 | A * | 9/1966 | Stewart | 212/71 |
| 3,346,127 | A * | 10/1967 | Pelton et al. | 212/71 |
| 4,878,796 | A * | 11/1989 | Ammeraal | 414/141.7 |
| 4,946,344 | A * | 8/1990 | Prins | 414/137.1 |
| 5,431,359 | A | 7/1995 | Belie | |
| 5,931,625 | A * | 8/1999 | Tax et al. | 414/140.3 |
| 6,494,143 | B1 * | 12/2002 | Bolonkin | 104/173.1 |
| 6,527,223 | B1 * | 3/2003 | Mondale | 244/30 |
| 2006/0182524 | A1 * | 8/2006 | Franzen et al. | 414/139.9 |
| 2008/0112779 | A1 * | 5/2008 | Amoss et al. | 414/137.9 |
| 2008/0210810 | A1 * | 9/2008 | Parmley | 244/30 |

OTHER PUBLICATIONS

Website: "Tales of Future Past: Floating City", available as of May 9, 2008 via the web, accessed on Mar. 22, 2010.*

* cited by examiner

*Primary Examiner* — Gregory W Adams
(74) *Attorney, Agent, or Firm* — The Marbury Law Group PLLC

(57) ABSTRACT

A non-permanent system for the unloading and loading of ocean-going cargo vessels is described using a cargo transfer system which is supported by dirigibles or airships. The cargo transfer system is comprised of a moving transfer cable, a cargo lifting device and a cargo staging device. The system is used to transfer cargo between at least one sea terminus and at least one land terminus. Cargo is moved along the transfer cable from one terminus to another by means of dirigibles or airships. The sea-terminus of the system may be a floating temporary dock or a large ocean vessel such as an aircraft carrier. The system can be developed so that it is fully transportable and can be assembled and launched from a large ship, as well as recovered for movement to another location. The system may also be used at inland ports. The system can be sized to the port requirements using one transfer system or multiple systems.

16 Claims, 2 Drawing Sheets

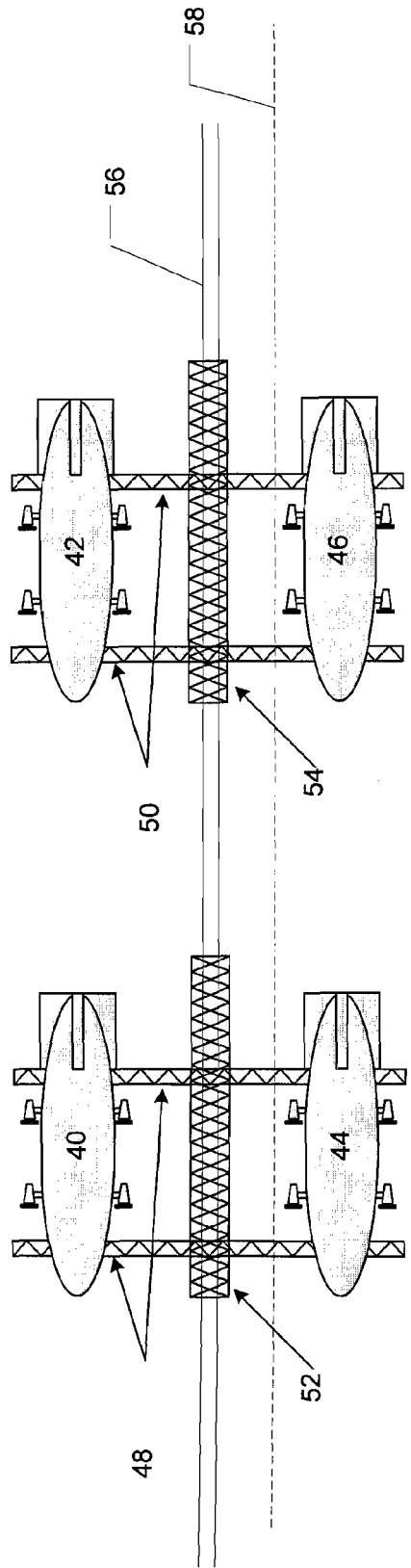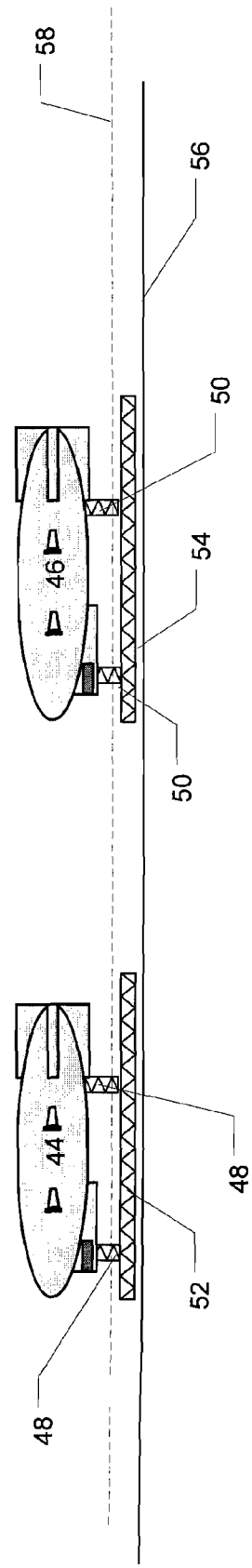

US 7,927,057 B2

OCEAN COMMERCE TRANSFER SYSTEM

BACKGROUND AND SUMMARY

This invention relates to facilities for loading, unloading, and transfer of cargo between ship and shore.

Seaports around the world are the nexus of international trade. Most international trade of manufactured goods is shipped through ocean ports. Cargo arrives at docks on the waterfront via truck or train. It may be stored in a warehouse before it is loaded onto a sailing vessel for transport. The cargo is loaded onto the vessels by large cranes. When the vessel reaches its destination port, the cargo is unloaded by cranes and may once again be stored in a warehouse before being transferred to the vehicles which will deliver it to its ultimate destination on land.

At present, the transfer of cargo between ship and shore is limited by several physical requirements:

Permanent infrastructure, such as piers, cranes, warehouses and roads, must exist to make the transfer possible.

Vessels taking on or unloading cargo must lay alongside a pier and tie up to the pier in a position that allows movement for rise and fall of the normal tide.

Vessels taking on or unloading cargo must remain in a relatively constant position next to the pier within the reach of cranes and other devices used to load and unload cargo.

During the loading and unloading process, cargo must be temporarily stored in the vicinity of the pier infrastructure.

The pier where the cargo transfer is taking place must provide close access to roads or railways so that cargo may be transported to and from the pier.

It may also happen that coastal port facilities and infrastructure may be lost or damaged due to many causes, including natural disasters, terrorist acts, or wars. There is also the possibility that ports may be lost in future due to other anthropogenic reasons, such as the rise of ocean levels due to global warming. These events may destroy or submerge ports and port facilities, or otherwise render them unusable.

Current methods of ship to shore cargo transfer do not address problems related to the loss of port facilities, creation of new port facilities and infrastructure. Because the infrastructure of current systems is permanent, it cannot be moved to another location if the port is flooded or otherwise made unavailable for the loading and unloading of cargo.

In the event of the loss of port facilities for large ocean-going vessels, one solution that may be suggested is barging of the cargo from ship to shore. However, this solution has limitations, as barges also require port offloading facilities which may not be usable due to the same or similar events that close ocean ports.

In the event of the loss of a port due to a natural disaster, terrorist act or war, it may not be feasible to rebuild the port structure of docks, jetties, cargo loading machinery and storage warehouses. For instance, high costs may prevent rebuilding or, in the case of a war, continued hostilities in the area may make it difficult to rebuild. In the event of a major global warming event, the ocean level is predicted to rise along the entire coastline of the world's continents. With the loss of port facilities due to rising sea level, the ability to stage cargo next to a moored ship is lost as the rising sea levels cover docks, piers, warehouses, bridges, train tracks and other infrastructure. Because the rise in ocean levels is projected over so large an area, it is not feasible to build locks and dams to hold back the rising water. Furthermore, it is not feasible for governments or for the commercial sector to build and rebuild new port facilties with every significant shift of sea level, due to high costs. Additionally, with coasts shrinking inland, if permanent facilities and structures are lost, it may be difficult to rebuild them in the space available. The available space for new infrastructure may be limited due to other existing buildings or structures, particularly in urban areas.

Rising tides from global warming may also lead to loss of inland port facilities. Just as a rising tide lifts all boats, a rising tide also floods all ports whether they are coastal or on inland rivers. Shipping on lakes and rivers may therefore also be disrupted in the event of a global rise in sea levels.

When port facilities become unavailable for shipping, it can disrupt economies and the daily lives of the people living in those countries where shipping can no longer occur. With the inability to ship or receive goods, economic downturns may result. Citizens of the affected countries may suffer personal hardships due to unavailability of goods, as well as economic hardships related to a depressed economy.

It is further the case that situations may arise where a port is required where one does not now exist. Creating such a facility is time consuming and costly and may not be responsive to the exigencies of a given situation. For example, humanitarian aid may be required in an area where there are no port facilities. National defense concerns might require a port to offload military forces. In both of these cases, speed of port creation is paramount. There may simply be no time to build facilities for large ships of the type now used, yet still positively affect the outcome of the given situation.

What would be useful is a system and method of delivering cargo that enables international ocean transport to continue despite events that may have caused loss of port facilities. Such a system could use either temporary or permanent port facilities, depending on availability, and could be used at inland or coastal ports. The temporary facilities could be either long-term or short-term use of parts of the existing commercial infrastructure and be flexible enough to accommodate a continuing rise of sea water and or a fluctuating rise and fall of sea level over the coming decades. To lift and load the cargo, vehicles should be used which are not wholly dependent on the availability of infrastructure such as roads or railroads. Such a cargo delivery system could be fully transportable and could be assembled and launched from a large ship such as an aircraft carrier, as well as recovered for movement to another location.

DESCRIPTION OF THE DRAWINGS

FIG. 2 illustrates a top plan view of the multi-dirigible support system for an embodiment of an ocean commerce transfer system for the transfer of cargo.

FIG. 3 illustrates an elevation view of the multi-dirigible support system for an embodiment of an ocean commerce transfer system for the transfer of cargo.

DETAILED DESCRIPTION

Figure 1:
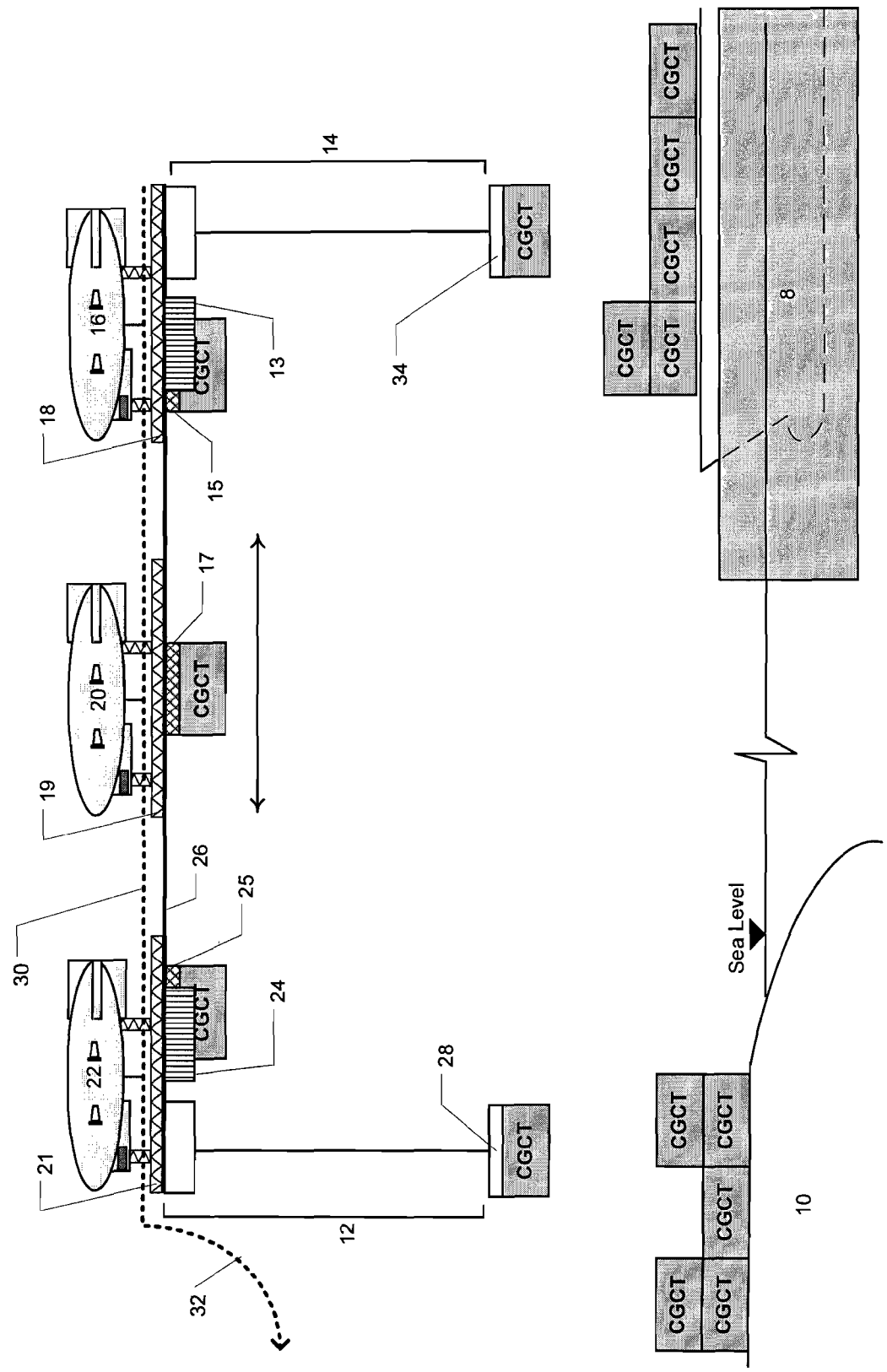
FIG. 1 illustrates an embodiment of an ocean commerce transport system for the transfer of cargo.

The Ocean Commerce Transfer System (OCTS) comprises a method and process for development and use and management of a system to replace port facilities using aerial transfer of goods between ship and shore. The system can accommodate the major types of ocean going vessels as well as coastal lighters and barges. Various embodiments allow for the set-up and use of a non-permanent system for the unloading and loading of ocean-going cargo vessels using the system which is supported by dirigibles/airships. The embodiments illustrated herein enable the continuation of ocean-going commerce when ocean ports and port-facilities are lost. Further the system is fully transportable and can be put together and launched from a large ship such as an aircraft carrier.

An embodiment allows for the non-permanent establishment of facilities for loading and un-loading of ocean-going ships.

Another embodiment allows for replacement of flooded or otherwise un-usable ports and port-facilities.

Yet another embodiment allows for aerial support of a cargo loading and unloading system using dirigibles/airships.

Referring now to FIG. 1, an embodiment of the cargo transfer system is illustrated. This embodiment comprises a land terminus 10, a portable sea terminus 8, a cargo lifting device 12, 14 at either end of the transfer system, such cargo lifting devices supported by a dirigible or airship 16, 22 and support bridges 18, 21, a cargo staging device 13, 24 at either end of the transfer system, such cargo staging devices supported by lighter-than-air (LTA) craft such as a dirigible or airship 16, 22, cable-mounted cargo support bridges 15, 17, 25, and a continuously looped, moving cargo transfer cable 26 which is supported by LTA craft 16, 22 using cable support bridges 18, 19, 21. As illustrated herein, additional LTA craft 20 may be employed to support the system depending on the length required and the weight of cargo to be transferred. As further illustrated herein, the entire cargo transfer system may be powered by an electric power line 30 which is connected 32 to the local electric power grid. Cross-hatching within elements 13, 15, 17, 24 and 25 of FIG. 1 is meant only to distinguish elements from each other and is not meant to limit the color of these elements or the materials of which they are made.

In another embodiment, the cargo transfer system may also provide multiple cables to run multiple cargo transfer systems between land and sea. In this embodiment, multiple portable sea terminuses may be used.

Referring again to FIG. 1, the cargo lifting device 12, 14 comprises a device or cradle 28, 34 to attach to cargo itself or a cargo container, or a receptacle for lifting pelletized or random-sized bulk cargo; a device for lifting cargo and cargo containers; and the mechanism for lifting and lowering the cargo and cargo containers, including motors and other mechanical equipment such as gearing and other power transfer devices. The cargo lifting device can be any cargo lifting device known to the industry. By way of illustration, and not as a limitation, this part of the system may utilize existing devices for attaching to standard ocean transport containers (often referred to as sea-land containers), or it may also utilize existing lifting and hoisting equipment for other cargo including break-bulk cargo. The cargo lifting device 12, 14 is fully supported by one or more LTA craft 16, 22, and includes standard rigging. Such standard rigging may include, but is not limited to, lifting hooks and spreaders.

As an example, and not as a limitation, the cargo lifting device 12, 14 may be used to shift cargo such as pallets of machinery, pallets of general cargo, coils of sheet steel or steel wire, steel beams, timber, or lumber. The cargo lifting device 12, 14 may also be used for transfer of bulk cargo, including but not limited to coal, ore, minerals, wheat, oats and other pelletized or random-sized cargo that is generally transferred by lift bucket and conveyor system.

Referring again to FIG. 1, when cargo loads are lifted to the design altitude, they are transferred from the lifting device 12, 14 onto a staging device 13, 24, using a mechanism such as a tracked device although this is not meant as a limitation. The transfer to the cargo staging device allows the lifting device to continue its operation of removing cargo separately from the actual transfer to the cargo transfer system. The cargo staging device 13, 24 may be a carousel or any other cargo staging device known in the industry that is able to hold one or more cargo loads lifted by the lifting device 12, 14, and whereby cargo may be transferred and fed from the cargo lifting device 12, 14 to the transfer cable 26. The cargo staging device 13, 24 is fully supported by one or more dirigibles or airships 16, 22. The cargo staging device 13, 24 functions as a feed mechanism to the transfer cable 26 at both the land-terminus 10 and the sea-terminus 8. The staging device 13, 24 also shunts available return cargo lifting equipment from the transfer cable 26 to the cargo lifting device 12, 14.

When the cargo reaches the cargo staging device 13, 24, it is attached to cable-mounted cargo support bridges 15, 17, 25. In the case of bulk cargo, the cargo staging device 13, 24 may require receptacles to receive the cargo. Such receptacles are then attached to the cable-mounted cargo support bridges 15, 17, 25. The staging device 13, 24 queues the suspended cargo loads for movement to the transfer cable 26.

The loaded cargo support bridges 15, 17, 25 are moved from one end of the cargo transfer system to the other by a continuously looped moving transfer cable 26 which is supported by dirigibles or airships 16, 22. The continuously looped cable 26 and the use of the cargo support bridges 15, 17, 25 allows multiple points of support for the supported loads and thereby increases the stability and safety of the cargo. The cable system itself comprises motors and power transfer devices such as gearing to enable swift yet stable transport of the cargo. Additional dirigibles or airships 20 may be employed to support the cable depending on the length required and the weight of cargo to be transferred. At the end of the trip, the cargo is transferred to a cargo staging device 13, 24, and then to a cargo lifting device 12, 14 which deposits the cargo on the floating sea terminus 8.

The dirigibles or airships 16, 20, 22 have lift capacity for heavy loads and have the ability to maintain their station against winds from any direction. The dirigibles or airships 16, 20, 22 are motorized and have the ability to move from point to point. The motorized capability of the dirigibles or airships 16, 20, 22 enables them to adjust their altitude and their position over the sea-terminus 8, over the land-terminus 10, or to maintain an intermediate position to support a long run of the transfer cable 26.

The dirigibles or airships 16, 20, 22 are fitted with directional engines or have thrusters with rotating cowls to allow the engines to direct their thrust along numerous vectors to aid in maintaining a stationary position and optimum altitude. The rotating engine or thrusters will allow a controller to position the thruster to vector the force from the propeller in the direction for maintaining station against the wind or to adjust the station against drift. The controller can be either automatic or human aided automatic. The ability of the dirigibles or airships 16, 20, 22 to vector their thrust also aids in achieving and maintaining load balance for the cable transfer system they support. The rotating engine or thrusters allow smoother altitude adjustment in response to changing mechanical configuration of the system or for different load capability.

The dirigibles or airships 16, 20, 22 are fitted with exterior maintenance platforms for daily cable and equipment inspection and maintenance.

The dirigibles or airships 16, 20, 22 may be stored in existing hangars near the site of the floating port facility, or a hangar may be specially built if resources and space allow. Alternatively, the dirigibles or airships 16, 20, 22 may be stored using outside mast-moored storage.

Should the cargo transfer system be required to move location, the dirigibles or airships 16, 20, 22 may be used to retrieve and move the components of the cargo transfer system to the new location.

In another embodiment, the elements of the cargo transfer system may be carried on, assembled on, launched from, and recovered to a large ship such as an aircraft carrier.

Referring again to FIG. 1, the sea terminus 8 of the cargo transfer system allows ships to tie up so that they may be loaded or unloaded. It may be a portable dock or pier. By way of illustration and not as a limitation, a common arrangement for such a portable dock or pier 8 could be a "U" configuration, which would provide greater stability against rocking and yawing caused by ocean swells than a single straight floating pier, due to the "U" shape covering greater area of the sea surface.

The portable dock or pier 8 is anchored to provide stability to the method and operations of the system. In one embodiment, the anchor system comprises a mooring buoy or buoys conventionally anchored to the sea bottom. The mooring buoy or buoys are attached by cable to the cargo transfer system, increasing the stability of the system and thus enhancing the load-carrying capability and the transfer speed of the system. There may also be intermediate anchors in the sea depending on the length of the transfer system. The portable dock or pier may be disconnected from its mooring buoys and towed by a vessel to a new location.

In another embodiment, the portable dock or pier 8 is fitted with station keeping motors and thrusters that could be used if needed for additional stability.

The portable dock or pier 8 can accommodate a wide variety of ocean going vessels. By way of example and not as a limitation, the portable dock or pier 8 can be used by container ships, break bulk cargo ships, bulk cargo ships, roll-on/roll-off cargo ships (RORO), coastal lighters, and barges. Transfer of cargo to and from ships can be accomplished using standard cranes, hoists and rigging on the portable dock or pier 8.

In another embodiment, other ships, such as those carrying liquid or gaseous products, can also be accommodated by the portable dock or pier 8. However transfer of liquid and gas may not require the system lifting capability over its full length, as they can be transferred by pipe that is either submerged or supported on the sea surface or just below the sea surface by pontoons. The transfer pipe for gas or liquid may be lifted by the dirigible or airship system upon reaching shore to enable the transfer to cross closed port areas and other infrastructure that would not be associated with its transfer.

Referring again to FIG. 1, in an alternative embodiment, illustrated by the dashed lines in element 8 of FIG. 1, a large vessel such as an aircraft carrier with modifications may be used to carry the cargo-moving mechanism of the sea terminus 8 of the cargo transfer system and the vessel may then be anchored, so that the vessel itself becomes the sea terminus 8.

The land terminus 10 may be an existing location that allows movement of the cargo from the system to land-infrastructure transport. In emergency operations this could include alternative locations such as a shopping center parking lot or the parking lots at a sports arena. The requirements for the land-terminus 10 are access to transportation by road, rail or air and a paved area to stage the transfer of the cargo once placed on the ground to one of these modes of transportation. Cargo can be received at the land-terminus 10 from all types of land transportation, including train and truck. Normal operations of the system would necessitate an area large enough to storage and transfer large quantities of cargo. In extreme cases or during extraordinary events, the footprint of the operation may be as small as a single cargo container with area for a truck to be loaded from the cargo lifting device 12, 14.

The land terminus 10 may be located inland from the coastline, yet cargo can be staged at the land terminus 10 much as it would be at an existing port facility, providing a major benefit of the system. Cargo staging areas may also be established much further inland than at present by extending the length of the transfer cable 26.

In the embodiment illustrated in FIG. 1, the entire cargo transfer system is powered by an electric power line 30 which is connected 32 to the local electric power grid. As the power requirements fluctuate across the several parts of the system, operation of the system is most efficient via cable-supplied electric power. This also reduces the weight requirement on the dirigibles or airships 16, 20, 22 for internal combustion systems or for electric generators, as well as the fuel requirements for these devices. Cable-supplied electric power also greatly increases the safety of the system as there is not a requirement for carrying highly combustible fuel in the dirigibles or airships 16, 20, 22. Furthermore, using electric power enables the system to benefit from any source that provides electrical power including wind, wave, solar, coal fired, or nuclear energy. By way of illustration and not as a limitation, solar cells could be mounted on the dirigibles to collect power to support the operation of the cargo transfer system. Electric power also enhances the transportability and flexibility of the system, as it is able to tie into the existing power grid on the land side of the system. The cables of the power system can be fully supported by one or more dirigibles or airships 16, 20, 22. Cable can be hung from outriggers on the dirigibles or airships 16, 20, 22 to keep it clear of the system operating mechanisms. Cable can also be hung from a separate series of dirigibles or airships to reduce the load on the dirigibles or airships 16, 20, 22 supporting the cargo transfer equipment.

In another embodiment, the cargo transfer system may be powered in a number of ways. Such ways include, but are not limited to, systems such as direct drive internal combustion engines, and electric generators to drive electric motors. While this may decrease the payload capacity by the weight of the additional equipment, this will allow the system and method to be used where there is no electrical grid.

Referring to FIG. 2, another embodiment of the cargo transfer system is illustrated, wherein a transfer cable 56 is supported by dirigibles or airships 40, 42, 44, 46. The dirigibles or airships 40, 42, 44, 46 support the transfer cable 56 by use of cable support bridges 52, 54 which are connected to the dirigibles or airships 40, 42, 44, 46 by connector bridges 48, 50. The connector bridges 48, 50 are attached horizontally across the cable support bridges 52, 54, allowing support of the transfer cable 56 on either side by dirigibles or airships 40, 42, 44, 46. The connector bridges 48, 50 may be constructed of any reasonably sturdy and rigid material, such as steel frames, that will allow the dirigibles or airships 40, 42, 44, 46 to support and steady the cable support bridges 52, 54.

In another embodiment, the connector bridges may be connected vertically to the cable support bridges, to allow lifting of the cable from above by a single dirigible or airship at that point.

Referring to FIG. 3, an elevation view of the embodiment in FIG. 2 is illustrated. Again, the dirigibles or airships 44, 46 are attached to the connector bridges 48, 50, which are in turn connected to the cable support bridges 52, 54, allowing support of the transfer cable 56 by the dirigibles or airships 44, 46.

While disclosed with respect to particular embodiments in the drawings, it will also be understood by those familiar with the art of this invention that the invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the," is not to be construed as limiting the element to the singular.

What is claimed is:

1. A cargo transfer system (CTS) comprising:
   a first cargo lifting device;
   a first cargo staging device attached to the cargo lifting device;
   a transfer cable system attached to the cargo staging device;
   a lighter-than-air (LTA) craft attached to and supporting the cargo transfer system, the cargo staging device, the cargo lifting device, and the transfer cable system;
   the LTA craft connected to a cable support bridge by a connecting bridge;
   a second cargo staging device attached to the transfer cable system;
   a second cargo lifting device attached to the transfer cable system;
   a power source adapted to provide power to the CTS.

2. A cargo transfer system according to claim 1 in which the first and second cargo lifting devices comprise:
   a cradle adapted to attach to cargo; and
   a lift attached to the cradle to effect lifting and lowering of the cradle and associated cargo.

3. A cargo staging device according to claim 1 comprising a device that is able to hold one or more cargo loads lifted by the lifting device, whereby cargo may be transferred and fed from the cargo lifting device to the transfer cable system.

4. A cargo transfer system according to claim 1 in which the first and second cargo loading devices and first and second cargo staging devices are positioned at opposite ends of the CTS.

5. A transfer cable system according to claim 1 comprising:
   a continuously looped, moving transfer cable; and
   a plurality of cargo support bridges.

6. A transfer cable system according to claim 5 in which the transfer cable is suspended from cable support bridges.

7. A cargo transfer system according to claim 1 in which the LTA craft further comprises:
   directional engines.

8. A cargo transfer system according to claim 1 wherein the power source is selected from the group consisting of electric power from an electric grid, electric power from a hydrocarbon powered generator, batteries, and solar cells.

9. A method for transferring cargo between sea and land comprising:
   lifting cargo from a first terminus using a first cargo lifting device;
   transferring cargo to a first cargo staging device attached to the cargo lifting device;
   transferring cargo to a cargo transfer system attached to the cargo staging device;
   using lighter-than-air (LTA) craft to support the cargo transfer system, the cargo staging device, the cargo lifting device, and the transfer cable;
   connecting the LTA craft to a cable support bridge by a connecting bridge;
   transferring cargo to a second cargo staging device attached to the cargo transfer system;
   transferring cargo to a second cargo lifting device attached to the cargo transfer system;
   transferring cargo to a second terminus using a second cargo lifting device;
   powering the cargo transfer procedure using a power source adapted to provide power to the CTS.

10. A method for transferring cargo between sea and land according to claim 9 in which the first and second cargo lifting devices comprise:
    a cradle adapted to attach to cargo; and
    a lift attached to the cradle to effect lifting and lowering of the cradle and associated cargo.

11. A method for transferring cargo between sea and land according to claim 9 in which the first and second cargo staging devices comprise a device that is able to hold one or more cargo loads lifted by the lifting device, whereby cargo may be transferred and fed from the cargo lifting device to the transfer cable system.

12. A method for transferring cargo between sea and land according to claim 9 in which the first and second cargo loading devices and first and second cargo staging devices are positioned at opposite ends of the CTS.

13. A method for transferring cargo between sea and land according to claim 9 in which the transfer cable system comprises:
    a continuously looped, moving transfer cable; and
    a plurality of cargo support bridges.

14. A method for transferring cargo between sea and land according to claim 9 in which the transfer cable is suspended from cable support bridges.

15. A method for transferring cargo between sea and land according to claim 9 in which the LTA craft further comprises directional engines.

16. A method for transferring cargo between sea and land according to claim 9 in which the power source is selected from the group consisting of electric power from an electric grid, electric power from a hydrocarbon powered generator, batteries, and solar cells.

* * * * *